Patented Feb. 6, 1951

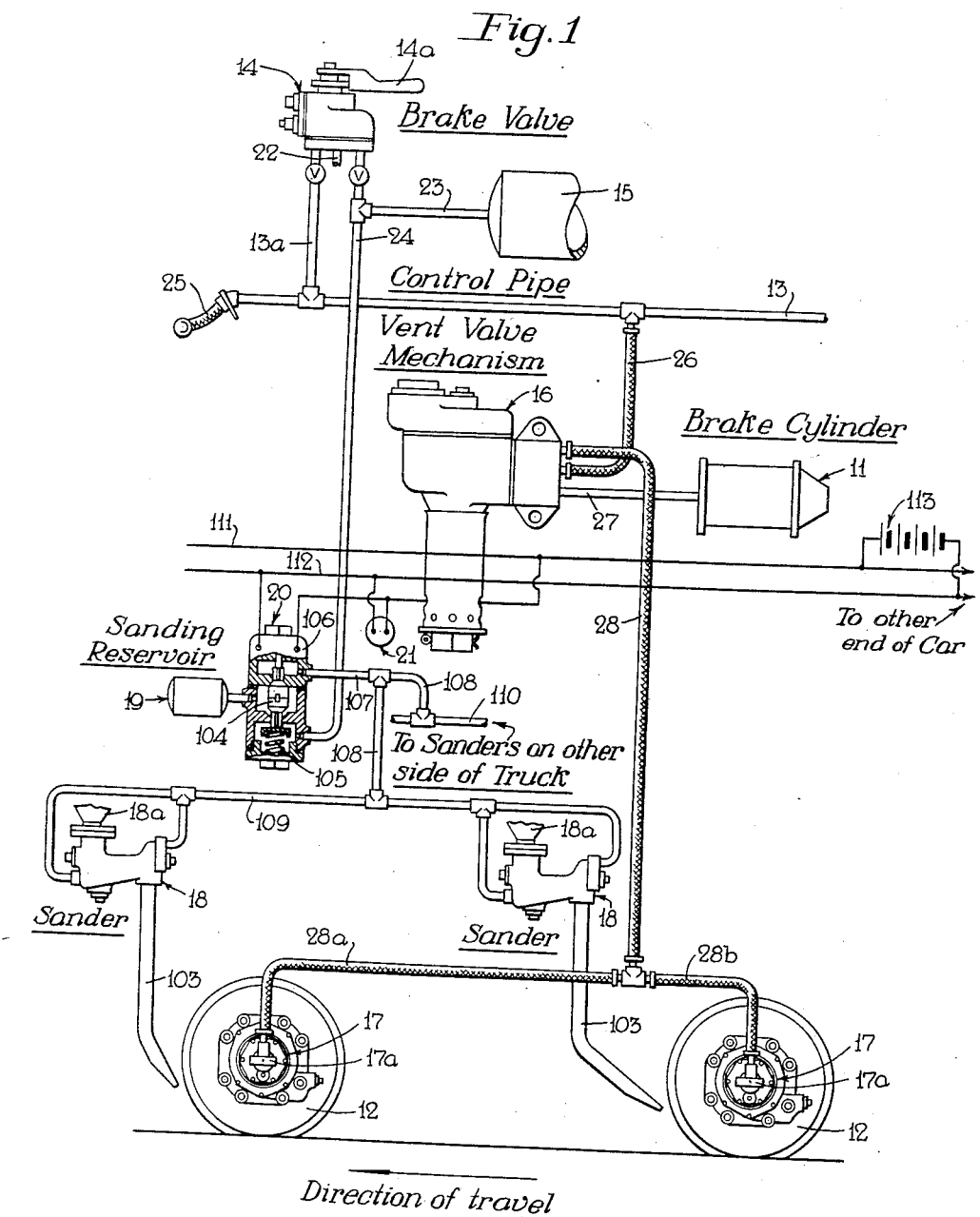

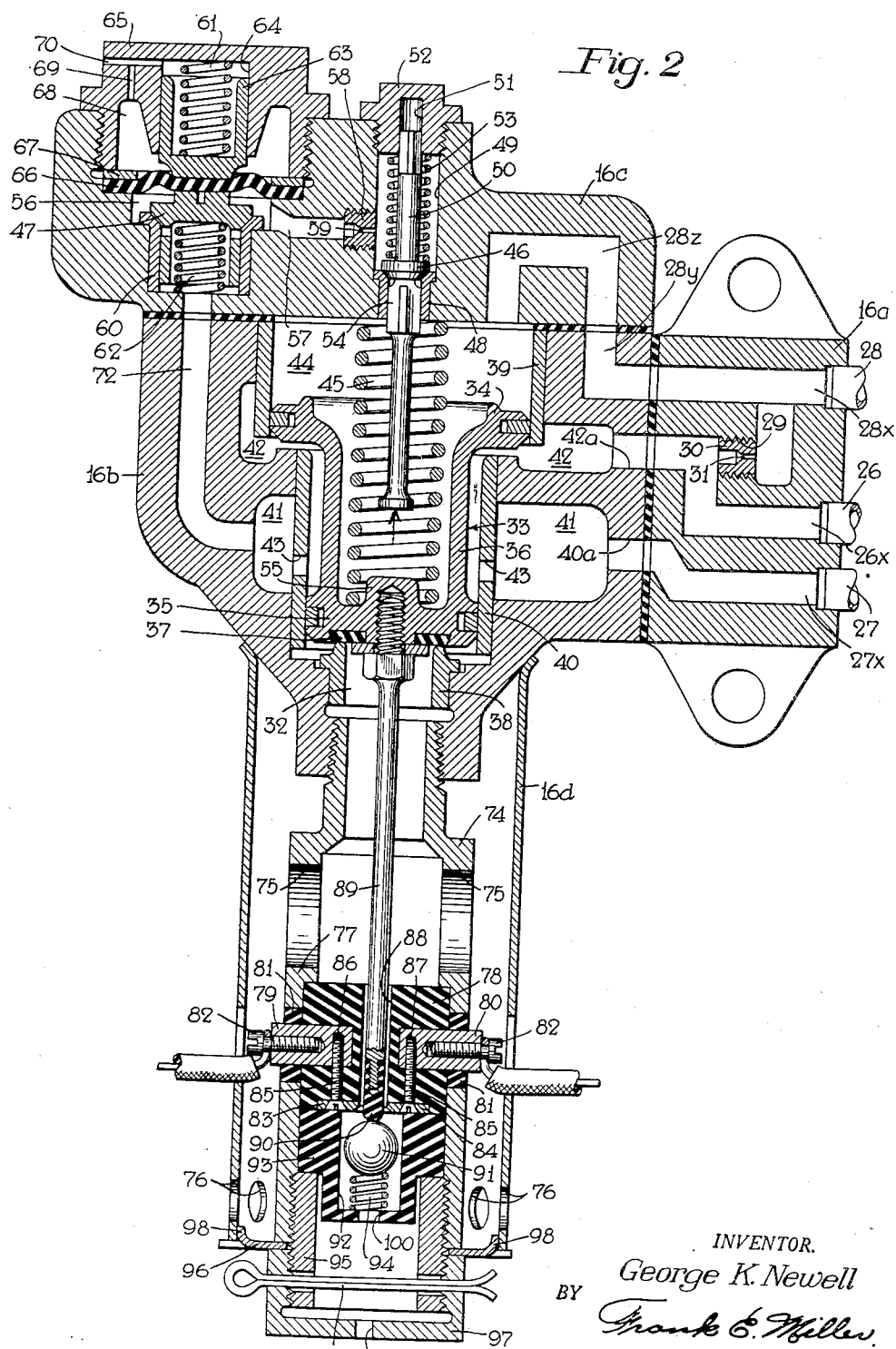

2,540,753

UNITED STATES PATENT OFFICE 2,540,753

COMBINATION VALVE AND SWITCH MECHANISM

George K. Newell, Pitcairn, Pa., assignor to The Westinghouse Air Brake Company, Wilmerding, Pa., a corporation of Pennsylvania Original application March 3, 1945, Serial No. 580,907. Divided and this application September 25, 1946, Serial No. 699,192

4 Claims. (Cl. 200—53)

This invention relates to combination valve and switch mechanisms and has particular relation to a combination valve and switch mechanism of the fluid pressure operated type, the present application being a division of my prior copending application, now Patent No. 2,447,713.

While the combination valve and switch mechanism constituting my present invention is adapted for use in various situations, it is particularly designed and adapted for use in fluid pressure brake control systems for vehicles, such as railway cars and trains, to automatically control the brake application and sanding of the rails in a manner to prevent sliding of the vehicle wheels. In order to adequately describe the character, operation, and use of the combination valve and switch mechanism constituting my present invention, it is described herein in connection with a fluid pressure brake control apparatus of the type including means for detecting the slipping condition of a vehicle wheel.

As employed herein the term "slipping" or "slipping condition" and similar variants refers to the rotation of the vehicle wheel at a speed differing from that corresponding to the speed of the vehicle at a given instant. As is well known, a slipping condition of a vehicle wheel may be induced either by excessive propulsion torque, in which case the wheel rotates at a speed higher than that corresponding to vehicle speed, or induced by excessive braking force, in which case the wheel rotates at a speed less than that corresponding to vehicle speed. In the present application the apparatus to be described relates to brake control and the term slipping will therefore refer to rotation of the vehicle wheel at a speed less than that corresponding to vehicle speed unless otherwise indicated.

When the braking forces exerted on a vehicle wheel while the vehicle is in motion are such as to exceed or overcome the adhesion between the wheel and the rail or road surface on which the wheel rolls, the wheel instantly begins to decelerate at an abnormally rapid rate toward a zero speed or locked condition. If the wheel reduces in speed to the locked or non-rotative condition, it is dragged along the rail or road surface. In the present application this is designated as a "sliding condition." The two terms "slipping" and "sliding" and their respective variants are accordingly not synonymous in meaning and the distinction between these terms must be borne in mind in reading the subsequent description of my invention.

Sliding of railway car wheels has long been a problem which the railroads have sought to solve for the reason that sliding of car wheels produces flat spots on the wheels and tends to lengthen the stopping distance of the train. Moreover repair and replacement of the "flat" wheels is an item of maintenance which the railroads desire to eliminate. Numerous proposals and devices have been made and employed for detecting the incipiency or imminence of a sliding condition of the wheels on the basis of the abnormal rate of deceleration of a vehicle wheel while it is in a slipping condition prior to actually becoming locked and sliding. Such devices or apparatus have been of an electrical or a mechanical nature and have functioned to rapidly reduce the degree of application of the brakes on a slipping wheel sufficiently to insure the restoration of the wheel back to a speed corresponding to vehicle speed, without permitting the wheel to reduce sufficiently in speed so as to become locked and slide, and then to reapply the brakes on the wheel which slipped.

Once a vehicle wheel begins to slip during a given brake application, it is likely that the relation of the braking forces reapplied on the wheel to the adhesion between the wheel and the rail following the slipping condition will continue to be such as to induce recurrent or repeated slipping cycles, which although tolerable are at the same time undesirable.

In some instances, it has been proposed to provide apparatus for automatically reducing the degree of the braking forces reapplied to a wheel that slips in order to minimize the possibility of recurrent or repeated slipping cycles. Such devices, while performing the objective of preventing recurrent slipping cycles, nevertheless provide a penalty in the way of reduced braking forces resulting in possible lengthening of train stopping distance.

It is desirable, therefore, not only to protect the vehicle wheels against sliding but also to provide for reapplication of the brakes on the wheels following any slipping condition of the wheels to a high degree so that there is no substantial penalty in the way of lengthening of stopping distance.

It has accordingly been proposed to provide apparatus for automatically sanding the rails in advance of the car wheels, at the time a slipping condition of any of the car wheels first occurs during any one brake application, for the purpose of so increasing the adhesion between the wheels and the rails as to enable full reapplication of the brakes on the wheels without causing recurrent slipping cycles on a wheel which first slipped and without causing slipping of other wheels on the same car of the train.

It is an object of my present invention to provide a novel combination valve and switch mechanism adapted to function to relieve the braking forces associated with a slipping wheel so as to prevent sliding of the wheel and to simultaneously effect or control the initiation of sanding of the track rails in advance of a group of car wheels including the slipping wheel.

The above object, and other objects of my invention which will be made apparent hereinafter, are obtained by an embodiment of my invention subsequently to be described and shown in the accompanying drawings wherein Figure 1 is a simplified diagrammatic view, showing a fluid pressure brake and sanding control apparatus employing my novel combination valve and switch mechanism, and Figure 2 is an enlarged sectional view of my combination valve and switch mechanism, showing complete details of construction thereof.

Description

In order to fully and adequately describe the character and function of my combination valve and switch mechanism, it is necessary to describe an environment including a simplified type of fluid pressure brake control apparatus of the well-known straight-air type in conjunction with the valve and switch mechanism itself.

Referring, therefore, to Figure 1, the fluid pressure brake control apparatus shown comprises a brake cylinder 11 operative through conventional brake levers and rigging, not shown, in response to the supply of fluid under pressure thereto to effect application of the brakes on the wheels of a wheel truck; a straight-air or control pipe 13 is charged with fluid under pressure to a degree corresponding to the degree of application of the brakes desired, as by suitable apparatus illustrated simply as a brake valve 14 of the well known self-lapping type; a reservoir 15 normally charged with fluid at a certain uniform pressure by a fluid compressor (not shown); and my novel combination valve and switch mechanism, referred to as vent valve mechanism 16, arranged to control the supply of fluid under pressure from the control pipe 13 to the brake cylinder 11 and the automatic release of fluid under pressure from the brake cylinder 11 under the control of so-called "Decelostats" or wheel-slip detecting devices 17 of the rotary inertia type, associated with the wheels 12.

The apparatus shown in Figure 1 further includes sanding and sanding control apparatus comprising a plurality of sanding devices, hereinafter referred to simply as sanders 18, of well known construction effective upon the supply of fluid under pressure thereto to deliver sand to the rails immediately in advance of the vehicle wheels 12, a sanding reservoir 19, and an electro-magnetically operated control valve 20, hereinafter referred to simply as the sanding magnet valve, for controlling the supply of fluid under pressure to charge the sanding reservoir 19 and the supply of fluid under pressure from the sanding reservoir to the sanders 18. A suitable electro-magnetically operated counting device 21 may also be provided for registering the number of operations of the vent valve mechanism in response to the occurrence of wheel slip conditions.

Considering the parts of the apparatus in greater detail, self-lapping brake valve 14 is of the well-known type having a self-lapping valve mechanism including a rotary operating shaft to which an operating handle 14a is attached. In the normal or brake release position of the brake valve handle 14a, the self-lapping valve 14 vents fluid under pressure from the control pipe 13 through a branch pipe 13a and an exhaust port and pipe 22 at the brake valve. When the brake valve handle 14a is shifted out of its brake release position into its application zone, the self-lapping valve mechanism of the brake valve 14 is operated to cause fluid under pressure to be supplied from the reservoir 15 by way of pipes 23 and 24 and pipe 13a to the control pipe 13, the pressure in the control pipe being automatically limited to a pressure dependent upon the degree of displacement of the brake valve handle out of its brake release position into the application zone.

The control pipe 13 extends longitudinally of a car and is suitably attached to the body of the car, sections of the control pipe on successive cars being coupled through suitable hose couplings 25 in conventional manner to provide a so-called train pipe extending throughout the length of a train.

The brake cylinder 11 and the vent valve mechanism 16 are carried on the spring-supported frame of the wheel truck 11. Fluid under pressure is supplied from the control pipe 13 to the brake cylinder by way of a flexible branch conduit or pipe 26, connecting the control pipe to the pipe bracket portion of the vent valve mechanism 16, and a pipe 27 connecting the pipe bracket portion of the vent valve mechanism 16 to the pressure chamber of the brake cylinder 11. Pipe 27 may be either rigid or flexible as desired. As will hereinafter appear, the vent valve mechanism 16 is normally conditioned to establish a communication therethrough between the branch pipe 26 and the brake cylinder pipe 27 so that the brake cylinder 11 is charged to the same pressure as that established in the control pipe 13. The several "Decelostats" 17 are connected pneumatically to the pipe bracket portion of the vent valve mechanism 16 through a flexible conduit or pipe 28, having corresponding branches 28a and 28b.

The vent valve mechanism 16 is identical, in part, to the vent valve mechanism disclosed and claimed in the copending application of Joseph C. McCune, now Patent No. 2,366,044, assigned to the assignee of the present application. According to my present invention, the vent valve mechanism shown in the patent of Joseph C. McCune just referred to is modified in a manner to function as both a pneumatic or fluid pressure control valve device and as an electrical switch device.

Referring to Figure 2, vent valve mechanism 16 comprises a pipe bracket and mounting section 16a, a valve or body section 16b, a cap section 16c, and a switch casing section 16d. The casing sections 16a, 16b and 16c are suitably secured together by screws, not shown, with sealing gaskets interposed between the cooperating contact faces of the casing sections. The switch casing section 16d, which is in the form of a tubular member or sleeve, is adapted to be supported from the casing section 16b in the manner hereinafter to be described.

The pipe bracket section 16a has three ports or passages 26x, 27x and 28x therein to which correspondingly numbered pipes or conduits 26, 27, and 28, respectively are connected. A port 29 in the body of the pipe bracket section connects the passage 26x and the passage 28x and is threaded to receive a screw type choke fitting 30 having a restricted orifice 31. The end opening of passage 26x at the inner face of the pipe bracket section 16a is opposite the port 29 so that choke fitting 30 may be inserted in the port through the end of the passage 26x before attachment thereof to casing section 16b. The purpose of the choke fitting 30 will be explained presently.

The valve section 16b has a lower conical portion in which a large vent port 32 is provided which is controlled by a differential piston valve 33.

The differential piston valve 33 comprises an annular piston 34 and a disc type piston 35 of smaller diameter, the two pistons being connected by a tubular stem 36. The outer face of the piston 35 has an annular gasket 37 secured therein for engaging an annular rib seat formed on a seat bushing 38 fixed, as by a press fit in a circular bore of the casing section 16b constituting vent port 32.

The piston 34 operates in a bushing 39 fixed as by a press fit in a bore formed in the casing section 16b. The piston 35 operates in a similar bushing 40 of smaller diameter also fixed as by a press fit in a bore formed in the casing, in coaxial relation to the bushing 39.

The bushing 40 extends through a chamber 41 having a port 40a to which the passage 27x in the pipe bracket section 16a is connected. The interior of the bushing 40 opens at the upper end thereof into a chamber 42 having a port 42a to which the passage 26x in the pipe bracket section 16a is connected.

A plurality of peripherally spaced ports 43 in the bushing 40 provides communication between the chamber 42 and the chamber 41 when the piston 35 of the piston valve 33 is seated on the seat bushing 38. It will thus be apparent that when the control pipe 13 in Figure 1 is charged with fluid under pressure, such fluid under pressure flows through the pipe 26, passage 26x and port 42a to chamber 42, where it acts on the lower face of the annular piston 34, and thence through the ports 43 in the bushing 40 to the chamber 41, and through the port 40a, passage 27x and pipe 27 to the brake cylinder 11.

Formed above the annular piston 34 within the bushing 39 is a chamber 44. A passage 28z formed in the cap section 16c connects chamber 44 to a passage 28y in the casing section 16b that, in turn, is connected to the passage 28x in the pipe bracket section 16a. It will thus be seen that when fluid under pressure is supplied to the chamber 42 beneath the annular piston 34, fluid under pressure is simultaneously supplied through the orifice 31 in the choke fitting 30 from the passage 26x to the passage 28x, and thence through the passages 28y and 28z to the chamber 44 above the piston 34.

A coil spring 45, contained in the tubular stem 36, is interposed between the face of the cap section 16c and the inner face of the piston 35 for urging the piston 35 into seated position on the seat bushing 38 in opposition to the force of the fluid pressure in chamber 42 exerted upwardly on the lower face of the piston 34.

When fluid under pressure is vented from the pipe 28, as by operation of the one or more of the "Decelostats" 17 in the manner hereinafter to be described, at a rapid rate faster than that at which fluid under pressure is supplied through the choke orifice 31 to the passage 28x, a differential fluid pressure is built up on the annular piston 34 effective to urge the piston 34 upwardly in opposition to the force of the spring 45, the piston ultimately seating on the contact face of the cap section 16c within the chamber 44.

In such position of the piston valve 33, the piston 35 is in a position above the ports 43 in the bushing 40, thereby cutting off communication between the chamber 42 and the chamber 41 through which fluid under pressure may be supplied from the control pipe 13 to the brake cylinder 11. At the same time, with the piston 35 unseated from the seat bushing 38, the chamber 41 and the connected brake cylinder 11 are connected to atmosphere through the ports 43 and the exhaust port 32 in the manner more fully described hereinafter so that fluid under pressure is thus rapidly exhausted from the brake cylinder 11.

In order to maintain the piston valve 33 in its uppermost position, in which fluid under pressure is vented from the brake cylinder 11, until the pressure in the brake cylinder reduces below a certain low pressure, such as eight pounds per square inch, the vent valve mechanism 16 is provided with an arrangement comprising a poppet valve 46 and a control valve 47. The poppet valve 46 seats on a seat bushing 48 fixed in a bore 49 in the cap section 16c and has a cylindrical guiding stem 50 that is slidably received in a bore 51 in a screw plug 52 closing the open end of the bore 49. A coil spring 53, interposed between the screw plug 52 and the valve 46, yieldingly biases the valve into seated position on the seat bushing 48.

Extending from the valve 46 on the side opposite the guide stem 50 is a fluted stem 54 that operates slidably in the bushing 48 and has a circular end portion or extension that extends downwardly through the chamber 44 into the interior of the tubular stem 36 of the differential piston valve 33 in coaxial relation thereto. The lower end of the stem 54 extends into sufficient proximity to a boss 55 on the inner face of the piston 35 that when the piston 35 is raised to its uppermost position, the boss 55 engages the end of the stem 54 and unseats the valve 46 a certain amount.

The control valve 47 is contained in a chamber 56 that is connected through a passage 57 to the bore 49. If desired, a choke fitting 58 having a restricted orifice 59 may be disposed in the passage 57, as shown, for somewhat restricting the rate of flow of fluid under pressure through the passage under circumstances hereinafter described. The valve 47 is normally seated downwardly on a seat bushing 60, as by a spring 61, in opposition to a spring 62 which tends to unseat the valve. The spring 61 acts on the closed end of a sleeve type follower 63 that operates slidably in a bore 64 formed in a relatively large cap screw or screw plug 65 that is, in turn, screwed into a suitably threaded bore in the casing section 16c, the follower engaging the upper face of an imperforate flexible diaphragm 66 of rubber or metallic composition secured in the casing section 16c, as by clamping the periphery thereof by the screw plug 65. A protective washer 67 may be interposed between the end of the screw plug 65 and the diaphragm 66 to prevent damage to the diaphragm in response to the tortional clamping action of the screw plug 65 when it is tightened home.

Surrounding the bore 64 and the follower 63 in the plug 65 is an annular chamber 68 which is open to the upper face of the diaphragm 66. Chamber 68 is also open to atmosphere through a passage 69 leading to an atmospheric port 70. Port 70 also connects the chamber at the back of the sleeve follower 63 to atmosphere to prevent dash-pot action thereof interfering with rapid unseating of valve 47.

Control valve 47 controls communication between chamber 56 and a passage 72 leading to the chamber 41. The inner seated area of valve 47 is thus subject to the fluid pressure in the chamber 41 and the connected brake cylinder 11.

When the poppet valve 46 is unseated upwardly by the piston valve 33, it causes the chamber 44 to be connected through the bore 49 and passage 57, including the choke orifice 59, to the chamber 56 at the lower side of the diaphragm 66. Assuming sufficient fluid pressure to be established in the brake cylinder 11, as hereinafter described, the valve 47 will have been unseated by the brake cylinder pressure acting on the inner seated area thereof in opposition to the force of the spring 61. With the chamber 56 thus charged with fluid at the same pressure as that in the brake cylinder, the force of the spring 61 is nullified and spring 62 is effective to hold the valve 47 unseated upwardly from its seat bushing 60. With both valves 46 and valve 47 unseated simultaneously, the chamber 44 and the connected chamber 56 are connected past the unseated valve 47 and through passage 72 to the chamber 41. The pressure of the fluid in the chamber 44 thus reduces substantially in accordance with the reduction of the pressure in the chamber 41 and the connected brake cylinder 11.

The piston valve 33 is maintained in its uppermost position by the pressure of the fluid in the chamber 42 beneath the piston 34 as long as the control valve 47 is unseated. When the fluid pressure in the chamber 56, active on the lower face of the diaphragm 66 and corresponding to brake cylinder pressure, reduces to a low value such as eighteen pounds per square inch, the force exerted by the spring 61 becomes effective to reseat the valve 47. With the valve 47 reseated, the fluid under pressure supplied through the orifice 31 of the choke fitting 30 from the supply pipe 26 and connected passage 26x and through the passages 28x, 28y and 28z to the chamber 44 above the piston 34, promptly restores the fluid pressure in the chamber 44 to a value which, with the assisting force of the spring 45, is effective to promptly shift the piston valve 33 downwardly to the position wherein the piston 35 is again seated on the seat bushing 38. A certain time interval elapses between the instant that the valve 47 is reseated and the instant that the piston 35 cuts off the further venting of fluid under pressure from the brake cylinder 11 due to the time required to build up the pressure in the chamber 44 through the choke orifice 31 sufficiently to shift the piston valve 33 downwardly. During this time interval, the reduction of brake cylinder pressure continues, and at the time the piston 35 actually seats on the seat bushing 38 to cut off further reduction in brake cylinder pressure, the brake cylinder pressure will have reduced to a value such as eight pounds per square inch.

With the piston valve 33 restored to its normal position as just described, the spring 53 acts to reseat the poppet valve 46 by reason of the disengagement of the boss 55 on the piston 35 from the end of the stem 45 of the valve 46. Spring 53 is of such strength as to maintain the valve 46 seated in opposition to the pressure of the fluid pressure built up in the chamber 44 and acting on the inner seated area of the valve 46.

With the piston valve 33 restored to its normal position shown in Figure 2, the supply communication between the supply pipe 26 and the brake cylinder pipe 27 is again established through the ports 43, and the pressure in the brake cylinder is thus again built up in accordance with the pressure established in the control pipe 13.

Upon restoration of fluid pressure in the brake cylinder 11, the valve 47 is again unseated in response to the brake cylinder pressure active through the passage 72 on the inner seated area of the valve. Chamber 56 is thus again charged to a pressure corresponding to brake cylinder pressure and such pressure acts through the passage 57 and bore 49 on the outer face of the poppet valve 46 to assist spring 53 in maintaining it seated against the pressure of the fluid in the chamber 44.

It will thus be seen that when the pressure of the fluid in the chamber 44 is suddenly reduced by operation of one or more of the "Decelostats" 17 in the manner more fully described hereinafter, the pressure of the fluid in the brake cylinder is promptly and automatically first reduced to a predetermined low pressure and then restored to a pressure corresponding to that established in the control pipe 13.

According to my present invention, the vent valve mechanism 16 further includes a switch mechanism within the switch casing section 16d arranged to be operated in response to movement of the piston valve 33. To this end, a tubular switch support member 74 is provided having at its upper end a portion of reduced diameter provided with threads whereby the member 74 may be screwed into the threaded end of the vent port 32 in the casing section 16b in such a manner that the fluid under pressure vented past the valve 35 from brake cylinder flows into the hollow interior of the tubular member 74.

As will be explained presently, the switch casing section 16d is supported in concentric surrounding relation to the tubular member 74. In order, therefore, to permit the escape of fluid under pressure from brake cylinder 11 past valve 35 to atmosphere the tubular member 74 is provided with a plurality of relatively large ports 75 in the wall thereof and the casing section 16d has a plurality of vent ports 76 in spaced relation around the periphery thereof, preferably at the lower end thereof as shown.

The lower end of the tubular member 74 has a bore therein of slightly larger diameter than the bore immediately adjacent thereto, so as to form an annular shoulder 77 serving as a stop for a cylindrical member 78 of insulating material that is inserted endwise into the bore from the lower end of the tubular member 74. Embedded in the member 78 in diametrically disposed relation are two terminal posts 79 and 80 respectively, which project radially outwardly through suitable openings in the wall of the tubular member 74. Insulating washers 81 surrounding the terminal posts 79 and 80 may be provided in the openings in the tubular member 74 through which the terminal posts extend in order to insure insulation of the terminal posts from the wall of the tubular member. The terminal posts 79 and 80 are provided with tapped bores to receive screws 82 for securing wires thereto.

At the lower end of the insulating member 78 is an annular recess for receiving two arcuate contact segments or members 83 and 84 of suitable metal or metallic alloy. The arcuate contact segment 83 is secured in place by a screw 85 that engages in a tapped bore 86 in the terminal post 79, thereby electrically connecting the segment 83 to the terminal post 79. Similarly, the arcuate contact segment 84 is secured in place by a screw 85 that engages in a tapped bore 87 in the terminal post 80, thereby electrically connecting the segment 84 to the post 80.

The cylindrical member 78 is provided with a central bore 88 in coaxial relation to the tubular member 74 through which a metallic operating stem 89 extends. Stem 89 is secured at its upper end, as by a screw threaded connection, to a central point in the piston 35. The lower end of the stem 89 is provided with an insulating tip 90 having a screw threaded connection with the metallic portion of the stem.

The insulating tip 90 of the stem 89 is adapted to engage a metallic sphere or ball contact 91 that is contained in a cylindrical bore 92 of a cylindrical insulating member 93 secured in the bore at the lower end of the tubular member 74 immediately beneath and in contact with the member 78. A coil spring 94 is interposed between the ball 91 and the closed end of the insulating member 93 for urging the ball 91 upwardly toward the arcuate contact segments 83 and 84. The length of the stem 89 is such that when the piston 35 is seated on the valve seat 38, the ball 91 is shifted downwardly from the contact segments 83 and 84 to interrupt the electrical connection therebetween. When the valve piston 33 is shifted upwardly in the manner previously described, the upward retraction of the stem 89 permits the ball 91 to be shifted upwardly by the spring 94 into simultaneous bridging contact with the arcuate contact segments 83 and 84, thereby electrically connecting the two terminal posts 79 and 80. For good electrical contact of the ball 91 therewith, the inner circular contact edges of the contact segments 83 and 84 are shaped to conform to the curvature of the surface of the ball.

In view of the characteristic operation of the piston valve 33 in snap-action fashion, it will be seen that the make and break of connections between the arcuate contact segments 83 and 84 by the ball contact 91 will correspondingly have a snap-action characteristic. The insulating tip 90 on the operating stem 89 prevents possible grounding of the circuit through the casing of the vent mechanism 16, which grounding is undesirable.

The insulating members 78 and 93 are held in position by a threaded sleeve 95 that is screwed into the outer threaded end of the bore at the lower portion of the tubular member 74, the inner end of the sleeve 95 engaging an annular shoulder formed on the member 93.

The switch casing section 16d rests at its lower end on an annular member or washer 96 that is fitted over the projecting threaded end portion of the sleeve 95 and is secured in clamped relation against the lower end of the tubular member 74 by an internally threaded cap member 97 screwed over the outer threaded end portion of the sleeve 95. In order to insure the concentric relation of the casing section 16d with respect to the tubular member 74, a plurality of peripherally spaced nibs 98 are provided on the washer 96. These nibs are formed as by making two closely spaced radial cuts inwardly from the outer periphery of the washer 96, the portion of the washer between the two cuts being bent upwardly to form the centering nibs 98. As will be evident in Fig. 2, the nibs 98 are circularly arranged and thereby hold the lower end of the casing section 16d in a fixed position on the washer 96.

In order to prevent loosening and possible loss of the cap member 97, a cotter pin 99 that extends through the cap member 97 and the sleeve 95, may be provided as shown.

The upper end of the casing section 16d is flared outwardly and engages the conical outer surface at the bottom of the casing section 16b in close contact so as to prevent the entrance of dirt or dust into the interior of the casing section 16d.

Although not shown, an annular sealing gasket of conical contour may be interposed between the flared upper end of the casing section 16d and the conical portion of the casing section 16b to insure a tight seal of the casing section 16d against the casing section 16b.

In order to enable at least a portion of the fluid under pressure vented past the piston valve 35 to function in a manner to assist in extinguishing the arc drawn between the ball contact 91 and the contact segments 83 and 84 as well as to clean the arcuate contact segments 83 and 84 and the ball contact 91 of any dirt or dust that may possibly accumulate thereon, fluid under pressure is allowed to escape to atmosphere successively through the bore 88 in the insulating member 78, a port 100 in the insulating member 93 at the lower end of the bore 92, and a port 101 in the cap member 97. The fluid under pressure escaping past the ball contact 91 also causes rotation thereof, thus causing different portions of the ball to engage the contact segments 83 and 84 when engagement of the ball and segments is effected and thereby distributing the wear uniformly to all portions of the surface of the ball contact.

The "Decelostats" 17 associated with the vehicle wheels 12 are of the type disclosed and claimed in the copending sole application of Joseph C. McCune, now Patent No. 2,447,709, and the copending joint application of Joseph C. McCune and George K. Newell, the present applicant, now Patent No. 2,447,710, both of which patents are assigned to the assignee of this application.

Since reference may be had to the patents just referred to for details of construction of the "Decelostats" it is deemed unnecessary to give more than a brief description thereof in this application.

Essentially each of the "Decelostats" 17 comprises a fly-wheel or rotary inertia element suitably journaled for rotation in a casing attachable to the end of the axle journal of a railway car truck in place of the usual end cover, and a driving connection between the fly-wheel and the end of the axle so arranged that whenever a certain rate of deceleration or acceleration of the wheels 12 affixed to the axle occurs, as when the wheels slip, the corresponding rotational lead or lag of the flywheel with respect to the axle is effective to cause unseating of a normal seated or closed pilot valve device 17a carried by the casing or a removable part of the casing attached to the axle journal.

The branches 28a and 28b of the conduit or pipe 28 connected to the pipe bracket portion of the vent valve mechanism 16 are connected respectively to corresponding pilot valve devices 17a of different wheel and axle units. Thus, when either of the pilot valve devices 17a are unseated or opened in response to the occurrence of a slipping condition of the corresponding wheel and axle unit, fluid under pressure is rapidly vented past the pilot valve devices from the pipe 28 and the connected chamber 44 of the vent valve mechanism 16, thereby causing a rapid reduction of the pressure in chamber 44 and consequent operation thereof in the manner previously described.

The sanders 18 are of standard and well-known construction and a detailed description thereof is thus deemed unnecessary in the present application. Suffice it to say, each one of the sanders 18 includes a hopper 18a containing sand which is delivered through a delivery pipe 103 to a point in advance of the corresponding vehicle wheel 12 in response to the supply of fluid under pressure to the corresponding sander.

Only two sanders are shown in Figure 1, one for each of the two vehicle wheels 12 shown. It will be understood, however, that an additional sander is provided for each wheel of the wheel truck and fluid under pressure is supplied to operate such sanders under this control of the common sanding magnet valve 20, as will be explained more fully presently.

Fluid under pressure is supplied to operate the sanders 18 under the control of the sanding magnet valve 20 which is, in turn, under the control of the switch portion of the vent valve mechanism 16.

The sanding magnet valve 20 is of standard construction comprising essentially a valve 104 that is normally biased to an upper seated position as by a spring 105 and is actuated to a lower seated position in response to energization of a magnet winding or solenoid 106. With the magnet winding 106 deenergized and the valve 104 in its upper seated position, communication is established past the valve 104 from the reservoir pipe 24 to the sanding reservoir 19, thereby causing the sanding reservoir to be charged with fluid at a pressure corresponding to that in the reservoir 15.

When the magnet winding 106 is energized and valve 104 is shifted to its lower seated position, the supply communication to the sanding reservoir is cut off and communication is established from the sanding reservoir 19 to a delivery pipe 107. Delivery pipe 107 is connected by two branch pipes 108 to a pipe 109 connected to both of the sanders 18 for the wheels 12 on one side of the car truck and to a pipe 110 connected to the sanders, not shown, for wheels on the other side of the car truck.

It will thus be apparent that when the magnet winding 106 of the sanding magnet valve 20 is energized, fluid under pressure is supplied from the sanding reservoir 19 to all of the sanders 18 for all wheels of the particular wheel truck.

The manner of energizing the magnet winding 106 of the sanding magnet valve 20 under the control of the switch portion of the vent valve mechanism 16 will be apparent in Figure 1. Briefly, a pair of bus wires 111 and 112 are provided which are connected respectively to the positive and negative terminals of a source of direct current, such as the usual storage battery 113 provided on passenger cars. The magnet winding 106 of the sanding magnet valve 20 is connected in series relation with the switch portion of the vent valve mechanism 16 across the battery bus wires 111 and 112. It will thus be seen when the piston valve 33 is actuated upwardly in response to the reduction of the pressure in the chamber 44 by operation of one or more of the pilot valve devices 17a of the "Decelostats" 17, the switch portion of the vent valve mechanism is thereby operated to close the circuit for energizing the magnet winding 106.

It is desirable for purposes of test and scientific analysis to know the number of times that the vent valve mechanism 16 is operated over a given period of time or over a given travel distance of a train. For this purpose, the counting device 21, of standard and well-known construction, is connected in parallel relation to the magnet winding 106 to the sanding magnet valve 20. Thus, each time that the piston valve 33 is operated through a cycle, that is raised and lowered, the electro-responsive portion of the counter 21 is energized and deenergized successively, the register of the counter advancing one unit with each individual energization of the electro-responsive portion of the counter.

Operation

The operation of the apparatus disclosed in Figures 1 and 2 should be apparent from the previous description. However, a brief summarization thereof may be helpful for further understanding of the operation as a whole. Let it be supposed that a train of cars equipped with the brake and sanding control apparatus shown in Figures 1 and 2 is traveling under power and that it is desired to effect an application of the brakes. The engineer on the locomotive of the train accordingly cuts off the propulsion power in the usual manner and causes the control pipe 13 to be charged with fluid under pressure corresponding to the desired degree of application of the brakes, as by operation of the brake valve 14. Fluid under pressure is accordingly supplied to the brake cylinder 11 in the manner previously described and application of the brakes associated with the vehicle wheels 12 is accordingly effected.

As long as the wheels continue to roll in the normal fashion and decelerate at a rate corresponding to the rate of retardation of the train, no further variation of the pressure in the brake cylinder 11 occurs except in response to variation of the pressure in the control pipe 13 under the control of the engineer, who may either increase or decrease the pressure, as desired, to correspondingly increase or decrease the degree of application of the brakes on the vehicle wheels.

If, when the brakes are first applied or at any time during a brake application, a wheel unit of a particular car truck, taken as that shown in Figure 1, begins to slip due to excessive braking force in relation to the adhesion between the wheels and the rails, the pilot valve device 17a of the corresponding "Decelostat" will operate so as to cause operation of the vent valve mechanism 16 to cut off the supply of fluid under pressure from the control pipe 13 to the brake cylinder of the corresponding wheel truck and to vent fluid under pressure therefrom at a rapid rate.

As previously described, the operation of the switch portion of vent valve mechanism 16 incidental to and simultaneous with the operation of the vent valve mechanism to vent fluid under pressure from the brake cylinder 11 causes energization of the magnet winding 106 of the sanding magnet valve 20 and of the operation counter 21. Fluid under pressure is accordingly supplied from the sanding reservoir 19 to the sanders 18 under the control of the magnet valve 20, thereby causing the sanders to operate to deliver sand in advance of the vehicle wheels 12 of the wheel truck having the slipping wheel or wheel unit at the same time that fluid under pressure is being vented from the brake cylinder.

As previously described, the vent valve mechanism 16 is so constructed and designed that, once it is operated to vent fluid under pressure from the brake cylinder associated therewith, it remains conditioned to continue the reduction of pressure in the brake cylinder to a certain low pressure such as eight pounds per square inch, after which it is automatically restored to its normal condition wherein the further reduction of pressure in the brake cylinder is terminated and the communication through which fluid under pressure is supplied from the control pipe to the brake cylinder is reestablished.

The time required for the pressure in the brake cylinder to reduce to eight pounds per square inch from the pressure usually established in the brake cylinder will ordinarily be of such length that the slipping wheels will have previously been restored to a speed corresponding to train speed and be again decelerating in accordance with the rate of retardation of the train by the time that the vent valve mechanism 16 is restored to its normal condition. Thus, when the vent valve mechanism 16 is restored to its normal condition, the pilot valve device 17a of the "Decelostat" associated with the wheels which just slipped will have been reseated so as to terminate the exhaust of fluid under pressure from the pipe 28 and the chamber 44 of the vent valve mechanism 16. Fluid under pressure corresponding to that established in the control pipe 13 will thus be restored in the brake cylinder 11 so that the brakes on the wheel truck having the slipping wheel unit or wheels will again be reapplied in accordance with the pressure of the fluid in the control pipe 13.

If the so-called "bad rail" condition or condition of poor adhesion between the wheels and the rails is a continuing one, it is likely that the reapplication of the brakes on the wheels of the truck having the wheels which just slipped will again cause those wheels to begin to slip unless the adhesion between the wheels and the rails is improved in the interim.

In this embodiment of my invention, the sanding of the rails is discontinued automatically in response to the restoration of the vent valve mechanism 16 to its normal condition by reason of the deenergization of the magnet winding 106 of the sanding magnet valve 20 in response to the restoration of the switch portion of the vent valve mechanism to its open position. In this embodiment of my invention, therefore, sanding of the rails is effected substantially only during the time interval during which actual slipping of the wheels occurs. The advantage of the rail sanding in this embodiment of my invention lies in the fact that the adhesion between the wheels and the rails is greatly improved by sanding during the slipping cycle of the wheels, thereby tending to insure prompt restoration of the slipping wheels to a speed corresponding to vehicle speed.

If following automatic restoration of fluid pressure in the brake cylinder 11, the same or other wheels on which the brakes are applied by the brake cylinder begins to slip, the above operation is repeated.

After a train is brought to a stop in response to an application of the brakes in the manner previously described, the brakes associated with the wheels continue to remain applied so long as a control pressure remains in the control pipe 13. This is so because the vent valve mechanism 16 is always restored to its normal condition automatically following operation thereof under the control of the "Decelostat" pilot valve devices 17a. In order to release the brakes prior to again starting the train, the engineer reduces the pressure in the control pipe 13 to atmospheric pressure, as by operation of the brake valve 14. Fluid under pressure is accordingly released from the brake cylinder 11 by reverse flow from the brake cylinder to the control pipe and thence to atmosphere through the exhaust port 22 at the brake valve.

The deenergization of the magnet winding 106 of a sanding magnet valve 20 in response to each restoration of the vent valve mechanism 16 to its normal condition automatically causes recharging of the sanding reservoir 19, thus providing a constantly available source of fluid under pressure for operating the sanders 18.

Having now described my invention, what I claim as new and desire to secure by Letters Patent is:

1. The combination with a fluid pressure receiving device, of a combined valve and switch mechanism comprising a casing having a supply port, a delivery port, and an exhaust port, a valve element having one position in which it establishes a connection between the supply and delivery ports through which fluid under pressure may be supplied to the receiving device and operative to a different position in which it severs the connection between said supply and delivery ports and opens a connection between said delivery port and said exhaust port through which fluid under pressure is released from the receiving device, a pair of insulated contact members in spaced relation to each other, a contact bridging element, resilient means constantly urging said bridging element toward a position in bridging contact with said insulated contact members, and a rigid element connected to the valve element and engaging said contact bridging element to separate it from the insulated contact members while the valve element is in its said one position and shifted in response to operation of the valve element to its different position to permit the said contact bridging element to engage the spaced contact members in bridging contact.

2. The combination with a fluid pressure receiving device, of a combined valve and switch mechanism comprising a casing having a port therein, a valve element contained in said casing and normally positioned to close said port and establish a communication through which fluid under pressure may be supplied to the receiving device and operative to a different position closing said supply communication to the receiving device and opening a communication through which fluid under pressure is released through said port from said receiving device, a tubular member secured in said port, an insulating support carried by and within said tubular support and having a passage therethrough in substantial coaxial relation to the valve element, a pair of spaced contact members supported by said insulating member on opposite sides of said passage respectively, a stem secured to the valve element and extending coaxially through said tubular member and the passage in said insulating member, a contact bridging element contained in said insulating member, and resilient means biasing said contact bridging element toward a position in bridging contact with said contact members, said contact bridging element being engaged by said stem while the valve element is in its position closing said port for disengaging the contact bridging element from said contact members and being moved in response to operation of the valve element to its different position to permit the engagement of the contact bridging element with the contact members.

3. The combination with a fluid pressure receiving device, of a combined valve and switch mechanism comprising a casing having a port therein, a valve element contained in said casing and normally positioned to close said port and establish a communication through which fluid under pressure may be supplied to the receiving device and operative to a different position closing said supply communication to the receiving device and opening a communication through which fluid under pressure is released through said port from said receiving device, a tubular member secured in said port, an insulating support carried by and within said tubular support and having a passage therethrough in substantial coaxial relation to the valve element, a pair of spaced contact members supported by said insulating member on opposite sides of said passage respectively, a stem secured to the valve element and extending coaxially through said tubular member and the passage in said insulating member, a contact bridging element contained in said insulating member, resilient means biasing said contact bridging element toward a position in bridging contact with said contact members, said contact bridging element being engaged by said stem while the valve element is in its position closing said port for disengaging the contact bridging element from said contact members and being moved in response to operation of the valve element to its different position to permit the engagement of the contact bridging element with the contact members, and means providing communication through which fluid under pressure released through said port from the said receiving device into said tubular member escapes to atmosphere.

4. The combination with a fluid pressure receiving device, of a combined valve and switch mechanism comprising a valve element having one position in which it establishes a supply communication through which fluid under pressure may be supplied to the receiving device and operative to a different position in which the supply communication is closed and a different communication is established through which fluid under pressure is released from the receiving device, a pair of insulated contact members in spaced relation to each other, a contact bridging element, resilient means constantly urging said bridging element toward a position in bridging contact with said insulated contact members, a rigid element connected to the valve element and engaging said contact bridging element to separate it from the insulated contact members while the valve element is in its said one position and shifted in response to operation of the valve element to its different position to permit the said contact bridging element to engage the spaced contact members in bridging contact, and means for causing fluid under pressure released from the receiving device to flow past said contact members and said contact bridging element to effect the removal of dust and dirt particles that may collect thereon as well as to assist in extinguishing the arc drawn between the contact bridging element and said contact members.

GEORGE K. NEWELL.

REFERENCES CITED

The following references are of record in the file of this patent:

UNITED STATES PATENTS

| Number | Name | Date |
|---|---|---|
| 1,938,327 | Green | Dec. 5, 1933 |
| 2,222,542 | Robison | Nov. 19, 1940 |
| 2,310,261 | Schwarzhaupt et al. | Feb. 9, 1943 |
| 2,356,177 | Pierson | Aug. 22, 1944 |